July 29, 1952 W. D. CROSBY 2,604,910
PORTABLE POWER-DRIVEN BAND SAW
Filed July 29, 1948 4 Sheets—Sheet 1
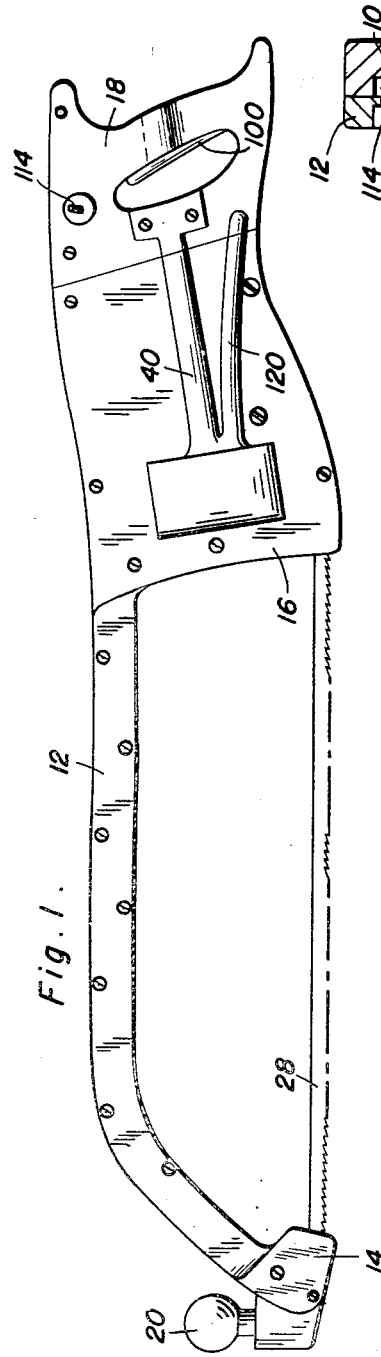
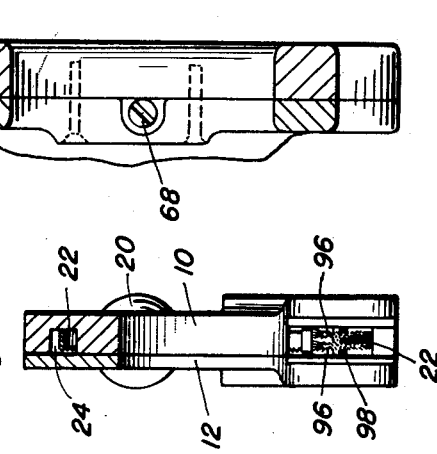
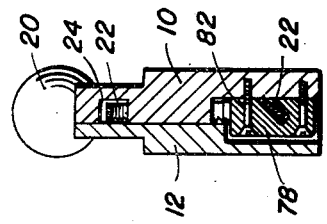
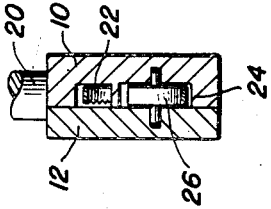
Wilbur D. Crosby
INVENTOR.
BY *Clarence A. O'Brien*
*and Harvey B. Jacobson*
Attorneys

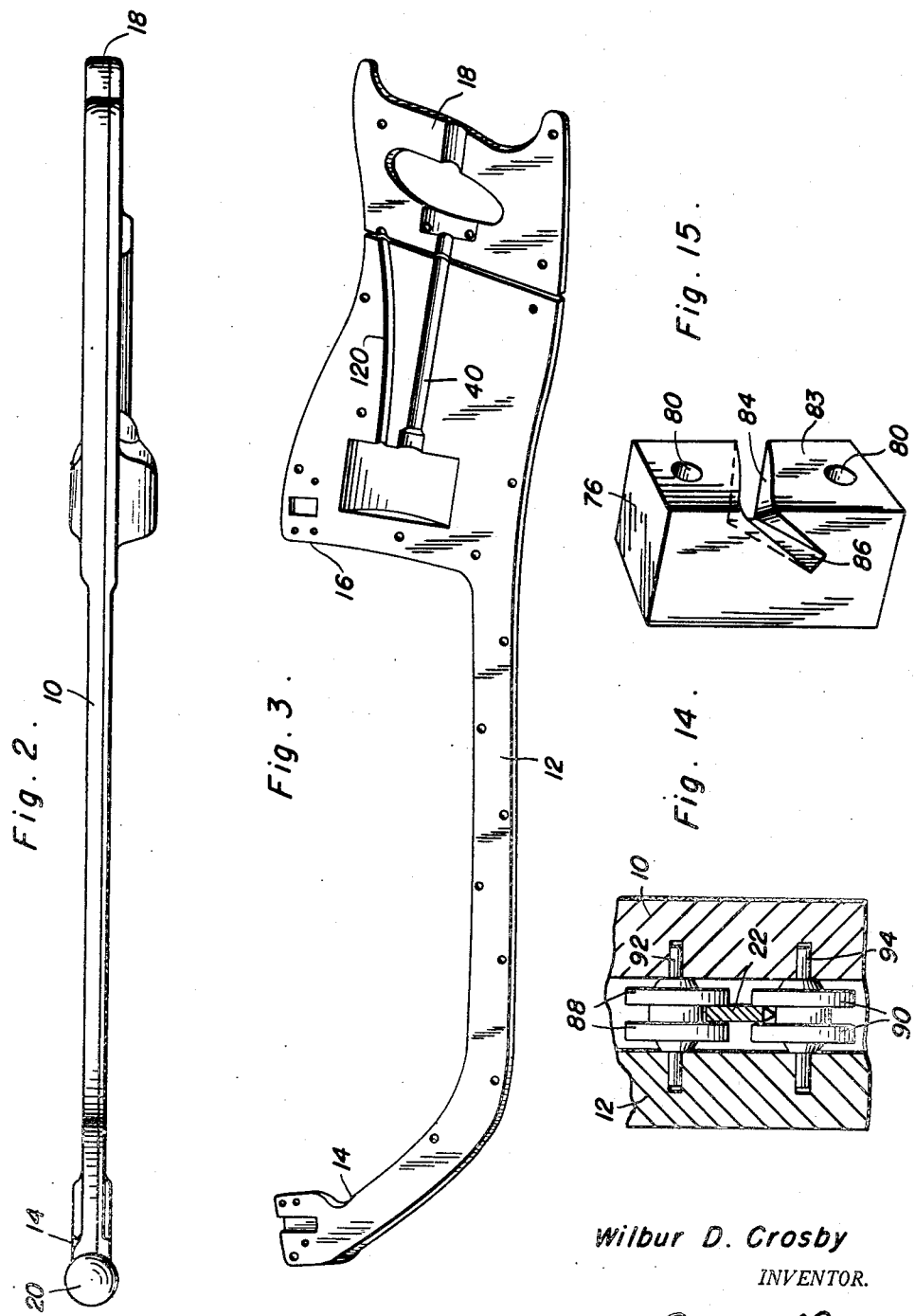

July 29, 1952      W. D. CROSBY      2,604,910
PORTABLE POWER-DRIVEN BAND SAW
Filed July 29, 1948      4 Sheets-Sheet 3
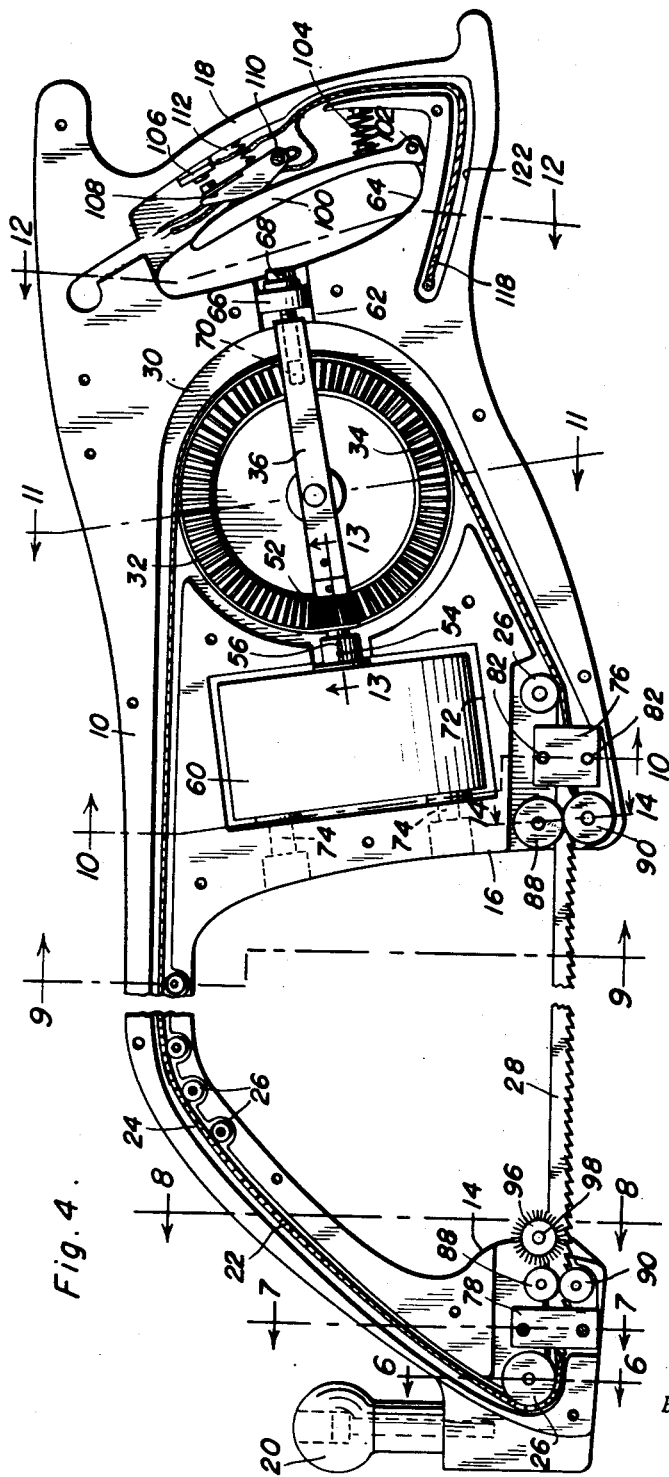
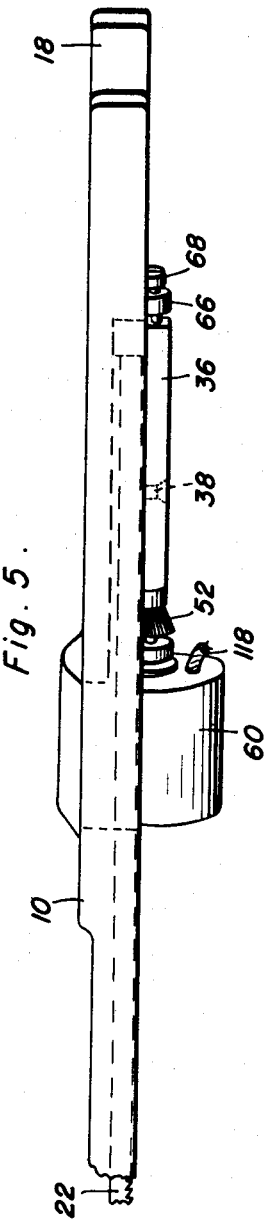
Wilbur D. Crosby
INVENTOR.
BY
*Thomas A. O'Brien*
*and Harvey B. Jackson*
Attorneys July 29, 1952
W. D. CROSBY
2,604,910
PORTABLE POWER-DRIVEN BAND SAW
Filed July 29, 1948
4 Sheets-Sheet 4
Fig. 9.
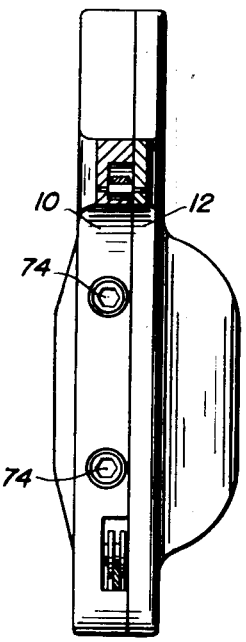
Fig. 10.
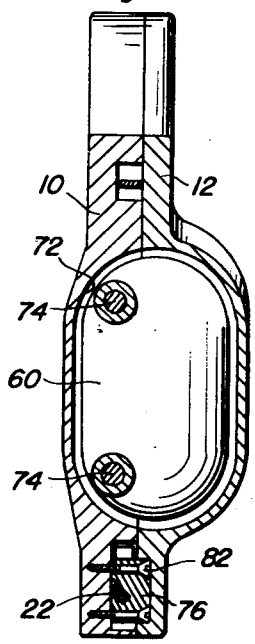
Fig. 11.
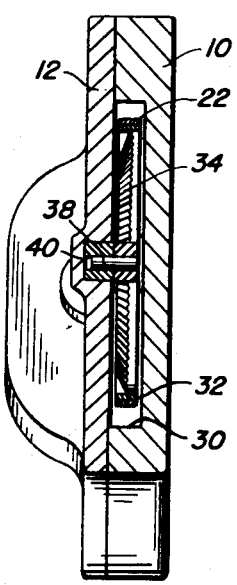
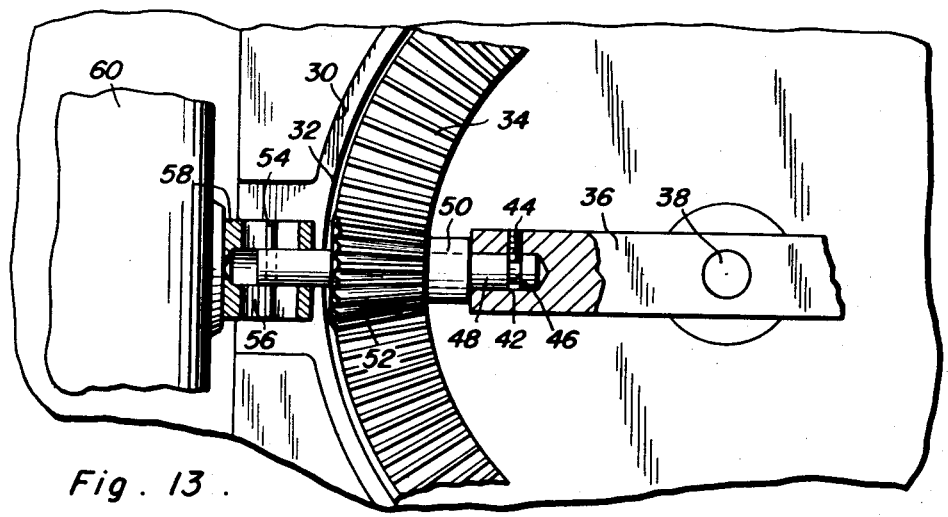
Fig. 13.
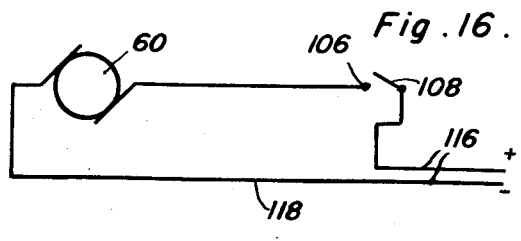
Fig. 16.
Wilbur D. Crosby
INVENTOR.
BY
*Thomas A. O'Brien*
*and Harry B. Jackson*
Attorneys

Patented July 29, 1952

2,604,910

UNITED STATES PATENT OFFICE 2,604,910

PORTABLE POWER-DRIVEN BAND SAW

Wilbur D. Crosby, Orinda, Calif.

Application July 29, 1948, Serial No. 41,386

4 Claims. (Cl. 143—19)

This invention comprises novel and useful improvements in a portable power driven band saw and more specifically pertains to a saw of the well known hack saw type having a band saw therein operated by an electric motor carried by the saw for cutting meat, metal, or the like and particularly adapted for use by surgeons, butchers, metal workers, or carpenters.

The principal object of this invention is to provide a portable power driven band saw having an improved, well balanced, light weight construction and which is highly efficacious for the purposes intended.

Subordinate specific objects of the invention are to provide an improved power driving means for an endless portable band saw, including an improved mounting of a driving electric motor in the handle of the saw.

These, together with various ancillary features and objects of the invention which will later become apparent as the following description proceeds are attained by this device, a preferred embodiment of which has been illustrated by way of example only in the accompanying drawings, wherein:

Figure 1 is a side elevational view of a preferred embodiment of the invention;

Figure 2 is a top plan view thereof;

Figure 3 is a side elevational view of a cover section of the frame of the saw;

Figure 4 is a side elevational view of the base section of the frame of the saw, the mounting of the various elements of the saw driving and controlling means being illustrated therein;

Figure 5 is a top plan view of Figure 4;

Figure 6 (Sheet 1) is a vertical transverse sectional detail view taken substantially on the plane of the section line 6—6 of Figure 4 and illustrating a guide roller forming a part of the invention together with its mounting in the base and cover sections of the saw frame;

Figure 7 is a vertical transverse sectional detail view taken substantially on the plane of section line 7—7 of Figure 4 and illustrating the construction, mounting and function of one of the saw blade guide blocks of the invention;

Figure 8 is a vertical transverse sectional detail view taken substantially on the plane of section line 8—8 of Figure 4 and illustrating in particular the mounting and arrangement of the rotary brushes forming a part of the invention;

Figure 9 (Sheet 4) is a vertical transverse sectional detail view taken substantially on the plane of section line 9—9 of Figure 4, the outer section of the frame being shown applied to the base section thereof;

Figure 10 is a vertical transverse sectional detail view taken substantially on the plane of section line 10—10 of Figure 4, illustrating in particular the disposition of the electric motor in a compartment in the base and outer sections of the frame of the saw;

Figure 11 is a vertical transverse sectional detail view taken substantially on the plane of section line 11—11 of Figure 4, and illustrating in particular the slide and guide arrangement for supporting and adjusting the tensioning and driving pulley of the saw operating means;

Figure 12 (Sheet 1) is a vertical transverse sectional detail view taken substantially on the plane of section line 12—12 of Figure 4, this view indicating more clearly the arrangement of the saw blade tensioning means;

Figure 13 (Sheet 4) is a horizontal sectional detail view taken upon an enlarged scale substantially on the plane of section line 13—13 of Figure 4, and illustrating in particular the driving connection between the motor and the saw blade driving pulley;

Figure 14 (Sheet 2) is a vertical transverse sectional detail view taken upon an enlarged scale substantially on the plane of section line 14—14 of Figure 4 and illustrating a set of saw guide rollers;

Figure 15 is an enlarged perspective view of one of the saw guide blocks forming a part of the invention; and, Figure 16 (Sheet 4) is a diagrammatic view of a suitable electrical circuit for operating and controlling the motor forming a part of the invention.

Referring now more specifically to the accompanying drawings, wherein like numerals designate similar parts throughout the various views, attention is directed first to the frame construction of the portable band saw, which frame includes complementary base and cover casing sections 10 and 12 respectively. The casing consists of the two sections 10 and 12 which are suitably and detachably connected to each other in any desired manner, is shaped in the form of a conventional hack saw, having an open side forming a throat or recess defined by the outer portion 14 and the inner portion 16 of the frame casing, together with a conventional hand grip portion 18 thereon. In order to facilitate the use of the saw, the outer end 14 is provided with a terminal knob or handle 20 which may be employed in conjunction with the hand grip portion 18 to assist in conveniently manipulating, positioning and holding the tool.

As may be best observed by reference to Figure 4, a flexible endless saw band 22 of suitable metallic construction and composition is rotatably guided and journaled in a chamber 24 formed in the base section 10, by means of a plurality of suitable guide pulleys or rollers 26. That portion of the saw blade which is housed within the chamber 24 is disposed in a manner perpendicular to the plane of the saw frame, that is with the teeth of the blade disposed laterally of the frame and with the side of the saw blade entrained over the guide rollers 26, as will be more readily apparent by reference to the detailed views of Figures 6–11. Further guide means are provided for twisting about its longitudinal axis and through ninety degrees, that portion of the saw blade indicated by the numeral 28, which extends across the open side of the frame between the outer and inner sides 14 and 16 of the frame, which guide means are of a particular construction to be hereinafter more fully described.

Inwardly of the saw frame and closely adjacent to the saw handle 18, the chamber 24 is provided with a centrally enlarged portion 30 forming a compartment within which is housed the saw blade driving pulley 32, about which the saw blade is entrained, which driving pulley is provided with a driving gear 34 which may be of the well known ring gear type, by means of which the driving pulley is operated.

As will be more readily understood by reference to Figures 4, 11, and 13, a support 36 in the form of a bar of generally rectangular cross section is provided with a fulcrum pin 38 by means of which the driving pulley 32 is rotatably journaled upon the support. This support 36 constitutes a slide which is guidingly received in a guide channel 40 formed in the base section 10, which guide channel extends substantially longitudinally of the saw frame and substantially medially thereof.

As shown best in Figure 13, the inward extremity of the support 36 is provided with an axial bore or recess 42 in which is detachably, rotatably but non-slidably secured as by a set screw 44, and annular groove 46, the inner extremity 48 of a pinion shaft 50 having a driving pinion 52 rigidly mounted thereon and in constant meshing engagement with the ring gear 34. The outer extremity of the pinion shaft 50 is provided with a diametrically disposed pin or key 54 which is non-rotatably but axially slidably received in a diametrical slot 56 formed in the end of the armature shaft 58 of the electric motor indicated at 60.

As will thus be seen, the pinion shaft is continuously in driving engagement with the motor 60, but is capable of axially slidable movement relative to the motor armature shaft 58 in accordance with sliding movement of the support 36 by which the pinion shaft is rotatably carried. Thus, the drive pinion 52, the ring gear 34 driven thereby and the saw blade driving pulley 32 may be longitudinally adjusted relative to the frame of the saw for tensioning the saw blade without in any way impairing the driving engagement of the motor 60 therewith.

To effect this tensioning adjustment, a slot or channel 62 is provided in communication with the opening 64 of the handle portion 18, and with the chamber 30 and a lug 66 is provided in the channel 62 for rotatably but non-slidably receiving an adjusting screw 68, whose inner extremity is threaded into the bore 70 indicated by dotted lines in Figure 4, in the support member 36, whereby upon rotation of the adjusting screw 68, which is accessible from the opening 64 in the handle 18, the slide 36 may be moved towards the handle, thereby tightening or tensioning the saw blade. Obviously, by moving the screw 68 in the other direction, the tension may be released from the blade as desired.

By reference to Figures 4 and 10 it will be readily seen that the frame casing sections 10 and 12 are laterally enlarged to provide a compartment 72 within which is securely mounted the motor 60. This motor may be conveniently but removably secured in the compartment 72 and mounted upon the base section 10 by means of a pair of fastening bolts 74 whose outer extremities are accessible as indicated in Figure 9 and in dotted lines in Figure 4, from the inner surface or wall 16 of the notched portion of the saw frame. Thus, by merely removing the cover section 12, convenient access can be had to the motor 60, the gearing connecting the motor with the driving pulley 32 as well as to the saw blade 22 throughout its entire length.

Attention is now directed to the construction of the guide members or blocks 76 and 78, which are respectively mounted upon the base section 10 of the saw frame case upon the inner and outer portions 16 and 14 respectively. These guide members which may be of identical construction are detachably carried by and mounted within the casing base section 10 and may be of any suitable form or shape, that indicated at Figure 15 being regarded as highly satisfactory for the purposes of this invention. The guide member 76 may conveniently comprise a block of generally rectangular construction having suitable apertures 80 for the reception of screws or other fastening means 82 (Figure 10) by means of which the block may be detachably secured to the base section 10. One face of the block such as that indicated at 83 is provided with a lateral, spirally twisted guiding slot or notch having inlet and outlet portions 84 and 86 which are spirally twisted at a predetermined angle with respect to each other, whereby the saw blade 22 passing therethrough will be twisted at its longitudinal axis to any extent desired. Obviously, this angular relation may be any desired extent, whereby a relatively moderate twist may be imparted or whereby as much as ninety degree twist may be imparted to that portion of the blade, indicated at 28, which lies between the two guide members 76 and 78.

As viewed in Figure 4, it is the function of the guide member 76 to twist the blade from the horizontal position of the same, in which position the blade is carried within the casing chamber 24, to a substantially vertical position which the blade assumes between the portions 14 and 16, in order to position the teeth of the blade in a manner ready for employment. Obviously, the function of the guiding means 78 is to return the blade from the position indicated at 28 through the necessary number of degrees of rotation about the longitudinal axis of the blade, in order to properly position the blade for passage through the guiding channel or chamber 24.

Disposed in the saw frame and mounted upon the base section 10 thereof, and inwardly of the adjacent sides of the guide members 76 and 78, or sets of guide rollers which serve to hold the portion 28 of the blade to the desired position in the plane of the saw frame, and serve to steady and reinforce the portion 28 against side strain, as well as shocks or vibration during use. One of these sets of guide rollers has been indicated in Figure 14, it being understood that the other set is identical therewith. The set includes vertically spaced upper and lower pairs of co-axial rollers 88 and 90, respectively mounted upon axles 92 and 94 journaled in the frame members 10 and 12, for receiving the saw blade 22 therebetween. If desired, the rollers 88 may be formed integrally with each other and also integrally with the axle 92 while the rollers may likewise be formed integral with each other and/or integral with the axle 94.

As will be readily seen, these rollers engage the saw tooth edge and the opposite edge of the portion 28 of the saw blade and serve to laterally brace and position the same throughout its travel between the frame members 14 and 16.

Mounted upon the frame portion 14, upon the base section 10, at the extreme inward extremity of that portion, are a pair of rotary brushes 96, journaled upon an axle 98 and positioned for embracing and engaging the opposite sides of the blade portion 28 in advance of the set of guide rollers 88 and 90 upon the portion 14, these rotary brushes serving to remove any filings or cuttings of metal, wood, bone or the like carried by the teeth of the blade, to prevent the induction of this matter into the mechanism of the power operated saw.

Any suitable operating means may be provided for controlling the operation of the electric motor 60. It is merely essential for the purposes of this invention that such control means shall be completely convenient and accessible to the hand of the operator which grips the handle 18 for instantaneous control thereby. One such satisfactory arrangement consists of the switch mechanism indicated in Figure 4 and which comprises an operating, finger grip lever 100 pivoted as at 102 to any suitable portion of the frame of the saw. A spring means 104 urges the control lever 102 in its inoperative position. A fixed electric terminal 106 is insulatingly mounted and carried by the handle portion 18, and cooperates with a movable terminal 108 pivotally mounted as at 110 and likewise insulated from the frame of the saw. A spring means 112 urges these switch contacts apart, the contact 108 being closed by the switch lever 100 which may be of insulating material.

A main control switch 114, Figures 1 and 12, which may be of the well known tumbler type, is mounted in the cover section 12, and provided with suitable electric conductors 116, Figure 16, connected in circuit with the fixed and movable switch contacts 106 and 108, and by means of suitable electric conductors 118 with the above-mentioned electric motor 60, the conductors 118 conveniently extending through complementary channels 120 and 122 formed respectively in the cover section 12 and the base section 10 as shown in Figures 3 and 4.

Thus, the electrical wiring of the device is conveniently and safely concealed and housed within compartments formed in the complementary casing sections of the frame and the master switch 114 as well as the finger grip switch lever 100 are conveniently disposed for operation by the hand of the operator which grasps the handle section 18.

From the foregoing, the construction, operation and advantages of the invention will be readily understood and further explanation is believed to be unnecessary.

It is to be distinctly understood that the principals of the invention are not limited to use in any particular type of saw, but may be employed through a variety of fields of utility, being especially adapted for use in saws, for use by surgeons or butchers, by metal workers, by carpenters or cabinet makers and by other artisans.

Since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having thus disclosed and described the invention, what is claimed as new is as follows:

1. A portable power driven band saw comprising a frame including a housing having complementary sections, an endless saw blade revolvably journaled in said housing, said housing having an opening in one side, said saw blade being disposed across said opening, a guide channel in said housing slidably receiving said blade in positions perpendicular to the plane of the frame, guide members within said housing at opposite ends of said opening, said guide members positioning that portion of the blade extending across the opening in the plane of the saw frame, an electric motor received within said housing, a driving connection within said housing between said motor and said saw blade, a saw blade tensioning means, said driving connection including a support slidably journaled in said frame, a saw blade driving pulley journaled on said support, a gear mounted on said pulley, a pinion shaft journaled on said support, a pinion secured to said pinion shaft and meshing with said gear, said pinion shaft having a non-rotatable, longitudinally slidable connection with said motor, said tensioning means consisting of adjusting means for longitudinally sliding said support.

2. A portable power-driven band saw comprising a frame and an endless saw blade, said frame including a handle and a saw supporting arm extending laterally therefrom and having an opening therebetween, channels disposed in said handle and arm, said saw blade being mounted in said channels in positions perpendicular to the plane of the frame and having a portion extending across said opening, said portion being positioned in the plane of said frame, said handle having a pair of communicating chambers therein, an electric motor disposed in one chamber, the channel in the handle intersecting the other chamber, saw driving means disposed in the other chamber and connected to said motor and to said saw blade, tensioning means extending from the exterior of the handle into said other chamber and connected to said saw driving means for shifting the latter whereby the tension of the saw blade may be varied, coupling means connecting said saw driving means to said electric motor and permitting axial movement between the motor and saw driving means but preventing rotational displacement therebetween.

3. A portable power-driven band saw comprising a frame and an endless saw blade, said frame including a handle and a saw supporting arm extending laterally therefrom and having an opening therebetween, channels disposed in said handle and arm, said saw blade being mounted in said channels in positions perpendicular to the plane of the frame and having a portion extending across said opening, said portion being positioned in the plane of said frame, said handle having a pair of communicating chambers therein, an electric motor disposed in one chamber, the channel in the handle intersecting the other chamber, saw driving means disposed in the other chamber and connected to said motor and to said saw blade, tensioning means extending from the exterior of the handle into said other chamber and connected to said saw driving means for shifting the latter whereby the tension of the saw blade may be varied, said saw driving means including a slide, means in said other chamber slidably and guidingly receiving said slide, a drive pulley journaled on said slide and engaging said saw-blade, operating means connecting said motor and said pulley.

4. A portable power-driven saw comprising a frame and an endless saw blade, said frame including a handle and a saw supporting arm extending laterally therefrom and having an opening therebetween, channels disposed in said handle and arm, said saw blade being mounted in said channels in positions perpendicular to the plane of the frame and having a portion extending across said opening, said portion being positioned in the plane of said frame, said handle having a pair of communicating chambers therein, an electric motor disposed in one chamber, the channel in the handle intersecting the other chamber, saw driving means disposed in the other chamber and connected to said motor and to said saw blade, tensioning means extending from the exterior of the handle into said other chamber and connected to said saw driving means for shifting the latter whereby the tension of the saw blade may be varied, said saw driving means including a slide, means in said other chamber slidably and guidingly receiving said slide, a drive pulley journaled on said slide and engaging said saw-blade, operating means connecting said motor and said pulley, said operating means comprising a shaft, a coupling slidably but non-rotatably connecting said shaft to said motor, means rotatably but non-slidably mounting said shaft on said slide, gearing connecting said shaft to said pulley.

WILBUR D. CROSBY.

REFERENCES CITED

The following references are of record in the file of this patent:

UNITED STATES PATENTS

| Number | Name | Date |
|---|---|---|
| 451,199 | Kesseler | Apr. 28, 1891 |
| 1,374,638 | De Cew, et al. | Apr. 12, 1921 |
| 1,438,540 | McKenna | Dec. 12, 1922 |
| 1,449,805 | Arnold et al. | Mar. 27, 1923 |
| 1,453,335 | Bennett | May 1, 1923 |
| 1,454,735 | Hamlin | May 8, 1923 |
| 1,512,425 | Klopfenstein | Oct. 21, 1924 |
| 1,516,529 | Hall | Nov. 25, 1924 |
| 2,113,931 | Biro | Apr. 12, 1938 |

FOREIGN PATENTS

| Number | Country | Date |
|---|---|---|
| 863,640 | France | Jan. 6, 1941 |